(12) United States Patent
Liao (10) Patent No.: US 10,389,153 B2
(45) Date of Patent: Aug. 20, 2019

(54) CHARGING CONTROL METHOD AND MOBILE TERMINAL

(71) Applicant: Guangdong Oppo Mobile Telecommunications Corp., Ltd., Dongguan, Guangdong (CN)

(72) Inventor: Fuchun Liao, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 188 days.

(21) Appl. No.: 15/397,291

(22) Filed: Jan. 3, 2017

(65) Prior Publication Data

US 2017/0117735 A1    Apr. 27, 2017

Related U.S. Application Data

(63) Continuation of application No. PCT/CN2015/092100, filed on Oct. 16, 2015.

(51) Int. Cl.
*H02J 7/00* (2006.01)

(52) U.S. Cl.
CPC .......... *H02J 7/0068* (2013.01); *H02J 7/0047* (2013.01); *H02J 7/0052* (2013.01); *H02J 7/0073* (2013.01); *H02J 2007/0001* (2013.01); *H02J 2007/0062* (2013.01); *H02J 2007/0096* (2013.01)

(58) Field of Classification Search
USPC ......................................................... 320/106
See application file for complete search history.

(56) References Cited

U.S. PATENT DOCUMENTS

| 2011/0016341 | A1* | 1/2011 | Tom | G06F 1/266 |
| | | | | 713/340 |
| 2011/0314201 | A1* | 12/2011 | Su | H02J 7/0055 |
| | | | | 710/316 |
| 2012/0166173 | A1 | 6/2012 | Fischbach | |
| 2014/0136863 | A1* | 5/2014 | Fritchman | G06F 1/26 |
| | | | | 713/310 |
| 2016/0064978 | A1* | 3/2016 | Lei | H02J 7/0004 |
| | | | | 320/114 |

FOREIGN PATENT DOCUMENTS

| CN | 101674366 A | 3/2010 |
| CN | 103066340 A | 4/2013 |

(Continued)

OTHER PUBLICATIONS

Extended European search report issued in corresponding European application No. 15895146.7 dated Jun. 25, 2018.

*Primary Examiner* — Samuel Berhanu
(74) *Attorney, Agent, or Firm* — Young Basile Hanlon & MacFarlane, P.C.

(57) ABSTRACT

Provided are a charging control method and a mobile terminal. The charging control method includes the follows. The mobile terminal receives a level signal transmitted from the charging device through a D-data line of a charging interface, so as to determine the type of the charging device. The mobile terminal transmits a handshake request signal to the charging device through a D+ data line of the charging interface if it is determined that the charging device is an adapter or a mobile power supply, and the handshake request signal is used to query whether the charging device supports a quick charging mode.

19 Claims, 10 Drawing Sheets

(56) References Cited

FOREIGN PATENT DOCUMENTS

| CN | 103972955 | A | 8/2014 |
|---|---|---|---|
| CN | 104092274 | A | 10/2014 |
| CN | 104238713 | A | 12/2014 |
| CN | 104393627 | A | 3/2015 |
| CN | 104426984 | A | 3/2015 |
| CN | 204304536 | U | 4/2015 |
| CN | 104701937 | A | 6/2015 |
| CN | 104701940 | A | 6/2015 |
| CN | 104967200 | A | 10/2015 |
| EP | 2887492 | A2 | 6/2015 |

\* cited by examiner

CHARGING CONTROL METHOD AND MOBILE TERMINAL

CROSS-REFERENCE TO RELATED APPLICATION

This application is a continuation of International Application No. PCT/CN2015/092100, filed on Oct. 16, 2015, and entitled "CHARGING METHOD, MOBILE TERMINAL, AND CHARGING DEVICE", the disclosure of which is herein incorporated by reference in its entirety.

TECHNICAL FIELD

The present disclosure relates to the field of charging, and particularly to a charging control method and a mobile terminal.

BACKGROUND

With the popularity of mobile terminals (such as smart phones, tablets, etc.), functions of the mobile terminal are gradually diversified; on the other hand, power consumption of the mobile terminal is also increasing. How to improve the charging speed of the mobile terminal battery has become a concern.

In view of this, quick charging technology has been proposed, and some manufacturers have introduced mobile terminals that support quick charging mode. For example, a variety of mobile terminals support VOOC flash charging technology with which the charging speed can be increased for at least 4 times. The quick charging technology can greatly shorten the charging time of the mobile terminal and is widely favored by user.

Under normal circumstances, in order to ensure the safety and reliability of quick charging, before switching to the quick charging mode, an adapter and the mobile terminal need to undergo a handshake negotiation process. Through handshake negotiation, the two parties can ask whether both sides support quick charging as well as determine a quick charging voltage, a quick charging current, and other parameters.

Currently, the handshake negotiation process with regard to quick charging is initiated by the adapter. The adapter can initiate the handshake negotiation process with regard to quick charging if a "certain condition" is met; however, it is difficult to define the "certain condition."

Therefore, between the adapter and the mobile terminal, when and how to initiate the handshake negotiation with regard to quick charging needs to be optimized.

SUMMARY

Disclosed herein are implementations of a method for charging control, comprising receiving a level signal transmitted from a charging device so as to determine the type of the charging device, transmitting a handshake request signal to the charging device if it is determined that the charging device is an adapter or a mobile power supply, wherein the handshake request signal is used to query whether the charging device supports a quick charging mode, receiving a handshake response signal transmitted from the charging device, wherein the handshake response signal is used to indicate that the charging device supports the quick charging mode, and switching to the quick charging mode.

Disclosed herein are also implementations of a method for charging control, comprising transmitting a level signal to a mobile terminal through a D-data line of a charging interface by a charging device, wherein the level signal is used to indicate the type of the charging interface, receiving a handshake request signal from the mobile terminal through a D+ data line of the charging interface by the charging device, wherein the handshake request signal is used to query whether the charging device supports a quick charging mode, transmitting a handshake response signal to the mobile terminal by the charging device, wherein the handshake response signal is used to indicate that the charging device supports the quick charging mode, and switching to the quick charging mode and transmitting a charging current of the quick charging mode to the mobile terminal through a power cable of the charging interface by the charging device, so as to charge a battery of the mobile terminal.

Disclosed herein are also implementations of a mobile terminal, comprising: a first receiving unit, configured to receive a level signal transmitted from a charging device, a judging unit, configured to determine the type of the charging device in accordance with the level signal, a transmitting unit, configured to transmit a handshake request signal to the charging device if the judging unit determines that the charging device is an adapter or a mobile power supply, wherein the handshake request signal is used to query whether the charging device supports a quick charging mode, a second receiving unit, configured to receive a handshake response signal transmitted from the charging device, wherein the handshake response signal is used to indicate that the charging device supports the quick charging mode, and a controlling unit, configured to cause the mobile terminal to switch to the quick charging mode.

BRIEF DESCRIPTION OF THE DRAWINGS

In order to illustrate the technical solutions of the present disclosure or the related art more clearly, a brief description of the accompanying drawings used herein is given below. Obviously, the drawings listed below are only examples, and a person skilled in the art should be noted that, other drawings can also be obtained on the basis of these exemplary drawings without creative work.

DETAILED DESCRIPTION

Technical schemes of the implementations of the present disclosure will be described clearly and completely with reference to the accompanying drawings. The implementations described below are merely part of the present disclosure, and a person skilled in the art should be noted that, other implementations obtained on the basis of these exemplary implementations without creative work should fall into the protective scope of the present disclosure.

"Charging device" referred to herein includes but not limited to an adapter or a mobile power supply. "Quick charging" or "quick charging mode" refers to a charging mode which has a charging speed that is higher than a charging speed of a normal charging mode. For example, quick charging mode can mean that, within about 30 minutes from the start of the charging, the mobile terminal can enter into a charging state where the average current is not less than 3 A or the total power charged is not less than about 60% of the rated capacity. This example is for illustration only and the present disclosure is not limited thereto.

In the related art, after connecting with a charging device through a charging interface, a mobile terminal will identify the type of the charging device at the first place. The mobile terminal and the charging device will conduct a handshake negotiation with regard to quick charging after the type of the charging device has been identified. However, the charging device has no idea about when the mobile terminal completes the type identification of the charging device, therefore, a handshake request that is sent by the charging device too early can affect the type identification process and cause an error in the identification process, on the other hand, a handshake request that is sent too late will lead to both sides cannot enter a quick charging mode, and this will affect the charging speed of the mobile terminal and cause the charging process to be prolonged. In other words, compared with the charging device, the mobile terminal is more aware of when the type identification of the charging device ends, therefore, the mobile terminal is more suitable as the initiator of the handshake request.

In addition, the type identification of the charging device by the mobile terminal is realized through the level signal transmitted through a D− line by the charging device; that is to say, the D-data line of the charging interface is always occupied by the charging device to transmit the level signal. Therefore, the mobile terminal can utilize a D+ line for communication with the charging device, so as to complete the handshake negotiation with regard to quick charging as well as avoid mixing with the D-data line. In this way, in the connection process between the mobile terminal and the charging device, the D+ line, the D− line, and a power cable can be used separately and cooperate with each other, and the problem that errors may occur in the handshake negotiation with regard to quick charging in the related art can be addressed. Implementations of the present disclosure will be described in detail with reference to the figures.

Figure 1A:
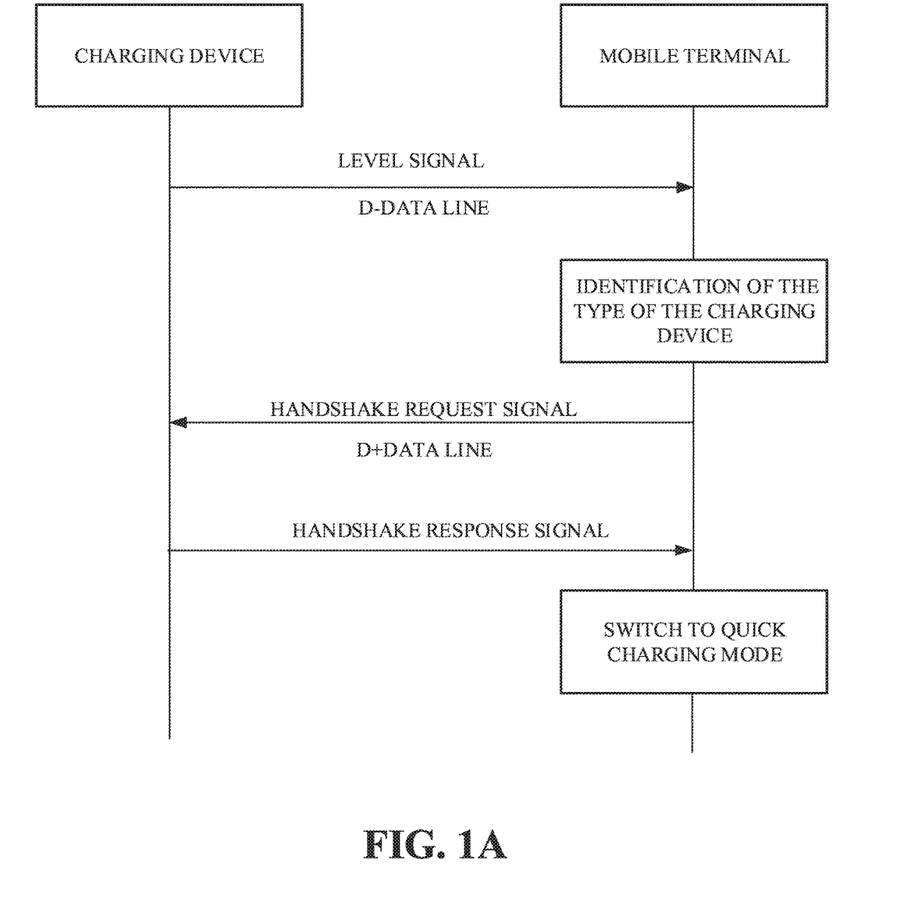
FIG. 1A, FIG. 1B, and FIG. 1C are schematic flow charts illustrating a charging control method according to an implementation of the present disclosure.

FIG. 1A illustrates the interaction between a mobile terminal and a charging interface which can be connected through a charging interface. As illustrated in FIG. 1A, the charging interface transmits level signals (for example, on D− data line) to the mobile terminal, and the mobile terminal can identify the type of the charging device according to the level signal. Thereafter, the mobile terminal can transmit a handshake request signal (for example, on D+ data line) to the charging device, and receive a handshake response signal from the charging device as well as switch to a quick charging mode in accordance with the handshake response signal.

Figure 1B:
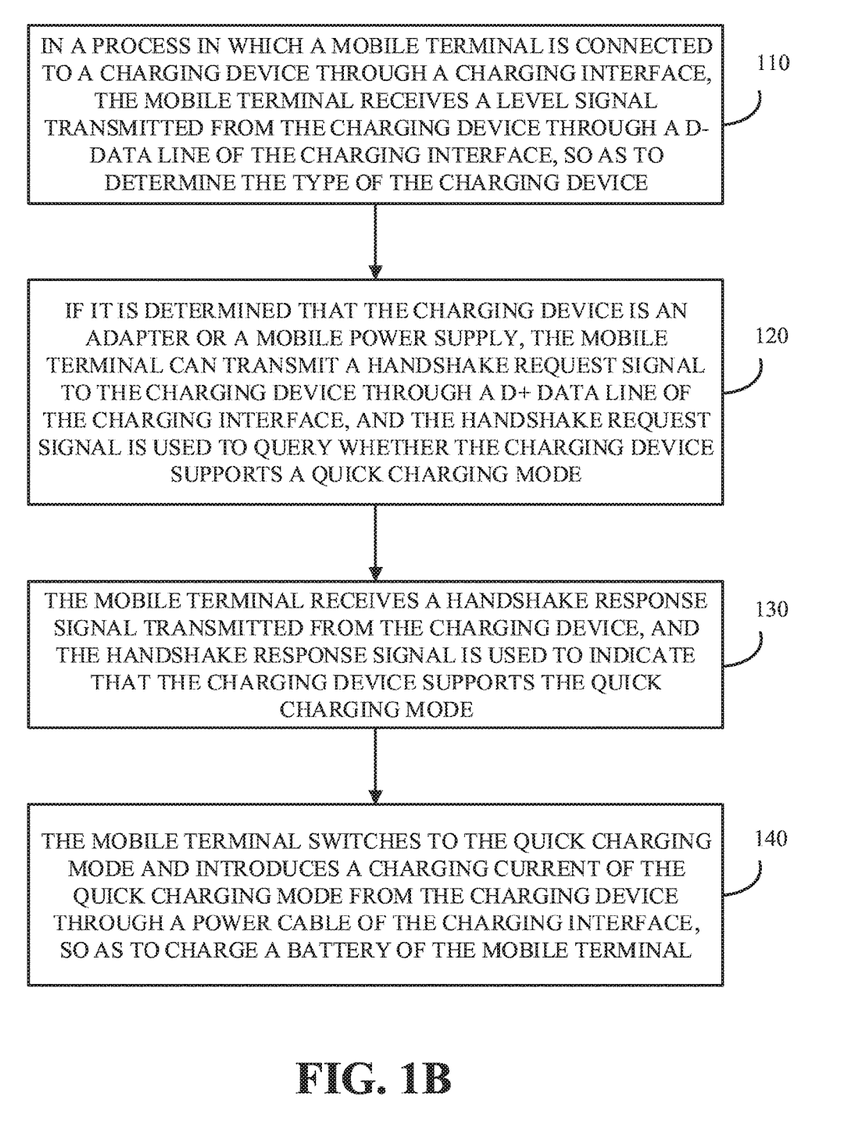

FIG. 1B is a schematic flow chart illustrating a charging control method according to an implementation of the present disclosure. The method illustrated in FIG. 1B can be performed at a mobile terminal, and can begin at operation 110 as illustrated in FIG. 1B.

At operation 110, in a process in which a mobile terminal is connected to a charging device through a charging interface, the mobile terminal receives a level signal transmitted from the charging device through a D-data line of the charging interface, so as to determine the type of the charging device.

It should be noted that, the charging interface includes but not limited to a Universal Serial Bus (USB) or a micro USB.

It should also be noted that, the level signal can be used to indicate the type of the charging interface of the charging device. For example, if the type of the charging interface is Universal Serial Bus_Standard Downstream port (USB_SDP), it can be assumed that the charging interface is not a charger, that is, not an adapter or a mobile power supply, and the charging interface can be a computer which cannot support high current charging; at this point, no subsequent handshake negotiation process is required and small current can be used for charging. If the type of the charging interface is not USB_SDP, for example, the type of the charging interface is Universal Serial Bus_Dedicated Charger port (USB_DCP), it can be assumed that the charging device is an adapter or a mobile power supply or other specialized equipment for charging.

As an implementation, the mobile terminal can receive the level signal through the D-data line, and determine the type of the charging interface of the charging device according to the level signal, on the basis thereof, the mobile terminal can further determine the type of the charging device according to the type of the charging interface of the charging device.

For example, the mobile terminal can determine whether the charging interface of the charging device is a universal serial bus standard downlink port (USB_SDP) type charging interface; if the charging interface of the charging device is not the USB_SDP type charging interface, the mobile terminal determines that the charging device is an adapter or a mobile power supply; if the charging interface of the charging device is the USB_SDP type charging interface, the mobile terminal determines that the charging device is not an adapter or a mobile power supply.

At operation 120, if it is determined that the charging device is an adapter or a mobile power supply, the mobile terminal can transmit a handshake request signal to the charging device, for example, through a D+ data line of the charging interface, and the handshake request signal is used to query whether the charging device supports a quick charging mode.

As an implementation, at operation 120, the mobile terminal can transmit the handshake request signal of a specific waveform to the charging device periodically through the D+ data line.

Figure 2:
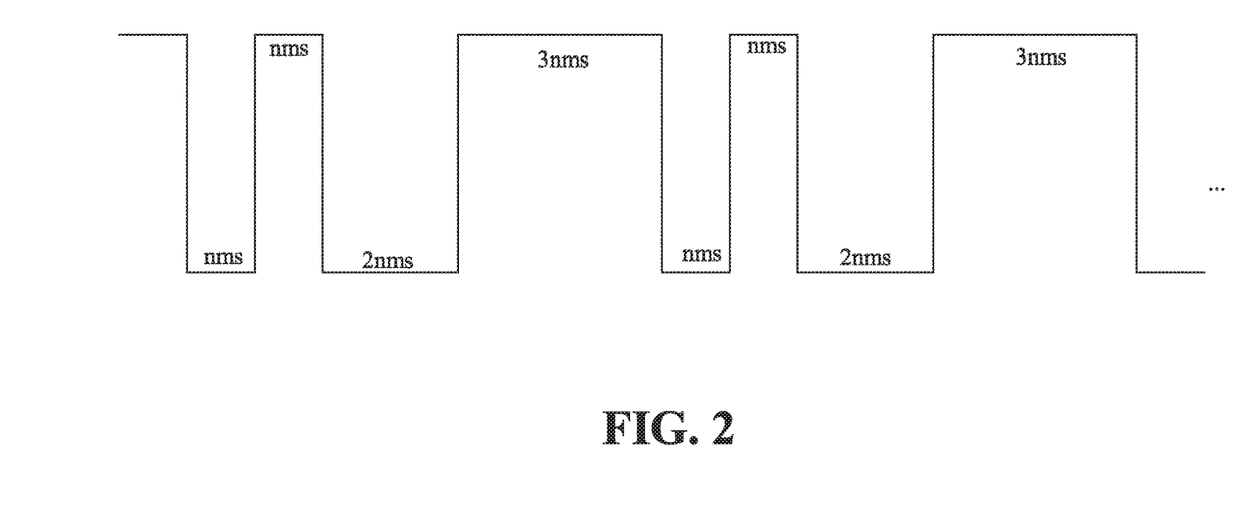
FIG. 2 is an exemplary diagram illustrating the waveform of a handshake request signal.

The handshake request signal can be predetermined by a protocol and can have a specific waveform. FIG. 2 illustrates an example of a specific waveform, as illustrated in FIG. 2, the D+ line outputs low level signals, and the mobile terminal can transmit a handshake request signal of a specific waveform in accordance with the timing illustrated in FIG. 2. Correspondingly, the charging device can receive the specific waveform in accordance with a specific timing, for example, the charging device can have a reception timing of as follows, after a rising edge interrupt is received, data collection will be delayed for 2 nms; in this way, the data parsed from the waveform of FIG. 2 is 01010101 . . .

At operation 130, the mobile terminal receives a handshake response signal transmitted from the charging device, and the handshake response signal is used to indicate that the charging device supports the quick charging mode.

For example, if the data parsed from the waveform is consistent with pre-negotiated data, the charging device can transmit the signal to the mobile terminal through the D+ line in accordance with a specific waveform (or specific data), so as to indicate that the charging device supports the quick charging mode.

At operation 140, the mobile terminal switches to the quick charging mode and introduces a charging current of the quick charging mode from the charging device through a power cable of the charging interface, so as to charge a battery of the mobile terminal.

It should be noted that, the mobile terminal can switch to the quick charging mode immediately after receiving the handshake response signal, or the mobile terminal can continue to negotiate with the charging device with regard to a charging current, a charging voltage or other parameters, and switch to the quick charging mode thereafter.

The mobile terminal can switch to the quick charging mode actively or passively. For example, the mobile terminal can receive a quick charging current from the charging device passively without performing any operation; or the mobile terminal can configure parameters of a charging chip inside actively, such that the parameters can match the quick charging mode. The present disclosure is not limited thereto.

According to the implementation of the present disclosure, the mobile terminal initiates the handshake negotiation process with regard to quick charging by transmitting the handshake request signal to the charging device after the type of the charging device has been identified, and the charging speed can be guaranteed; in addition, the mobile terminal can conduct handshake negotiation with the charging device through the D+ data line without conflicting with the D-data line used to transmit the level signal, and the problem that errors may occur in the handshake negotiation process with regard to quick charging in the related art can be addressed.

The process performed when the charging device is an adapter or a mobile power supply has been described above, FIG. 1B illustrates the situation where the charging device is not an adapter or a mobile power supply.

Figure 1C:
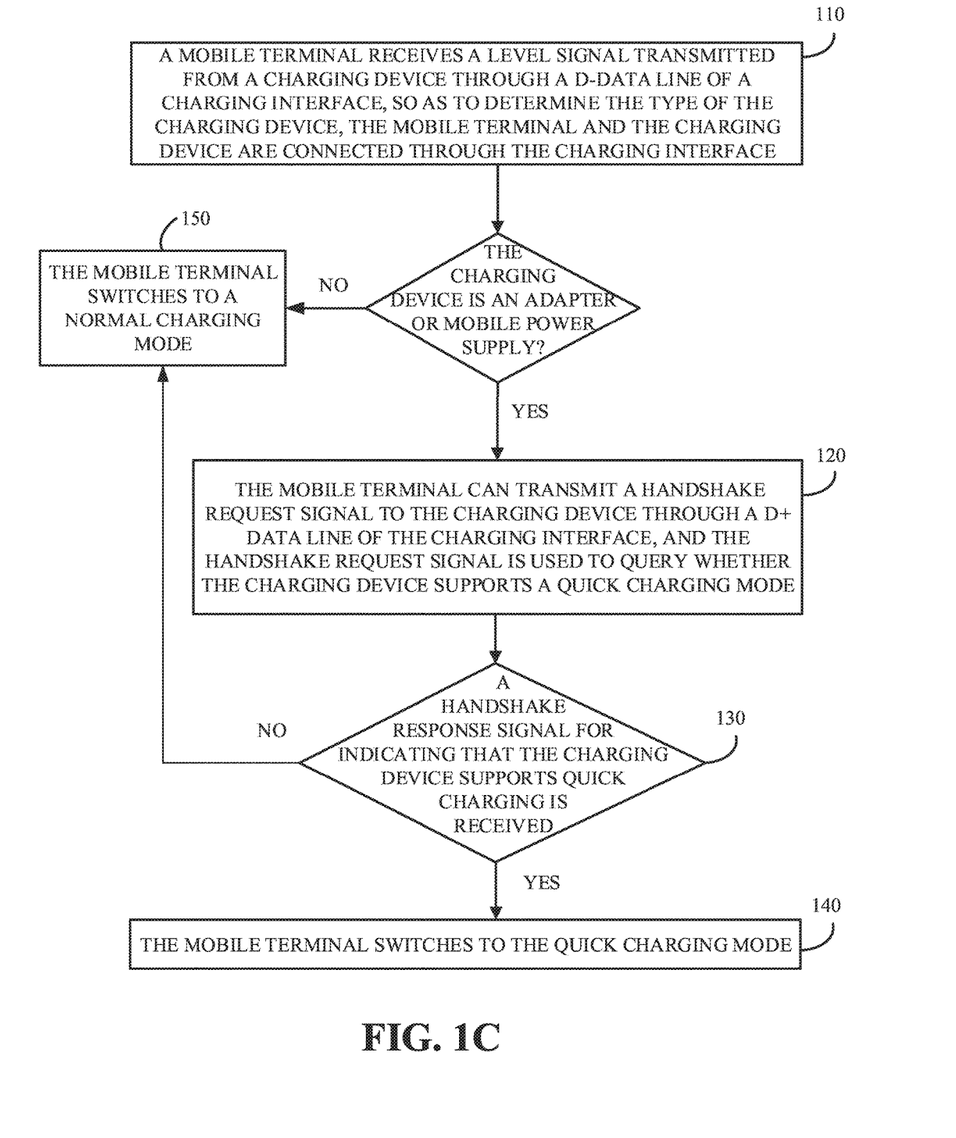

As illustrated in FIG. 1C, if it is determined that the charging device is not an adapter or a mobile power supply, at operation 150, the mobile terminal switches to a normal charging mode and introduces a charging current of the normal charging mode from the charging device through the power cable of the charging interface, so as to charge the battery of the mobile terminal. The quick charging mode has a charging speed that is higher than a charging speed of the normal charging mode.

As an implementation, if the mobile terminal did not receive the handshake response signal correctly at operation 130, the process will proceed to operation 150 to switch to the normal charging mode.

With aid of the technical scheme of the implementation, the mobile terminal can switch between the quick charging mode and the normal charging mode according to the type of the charging device.

The charging control method according to the implementation of the present disclosure has been described in detail from the perspective of the mobile terminal with reference to FIG. 1A-1C and FIG. 2; hereinafter, the method according to the implementation of the present disclosure will be described in detail from the perspective of the charging device with reference to FIG. 3. It should be noted that, the mobile terminal and the charging device are two entities that interact with each other during the charging process, steps or functions of the charging device can be similar to or corresponding to those of the mobile terminal. Duplicate descriptions are appropriately omitted for simplicity and clarity.

Figure 3:
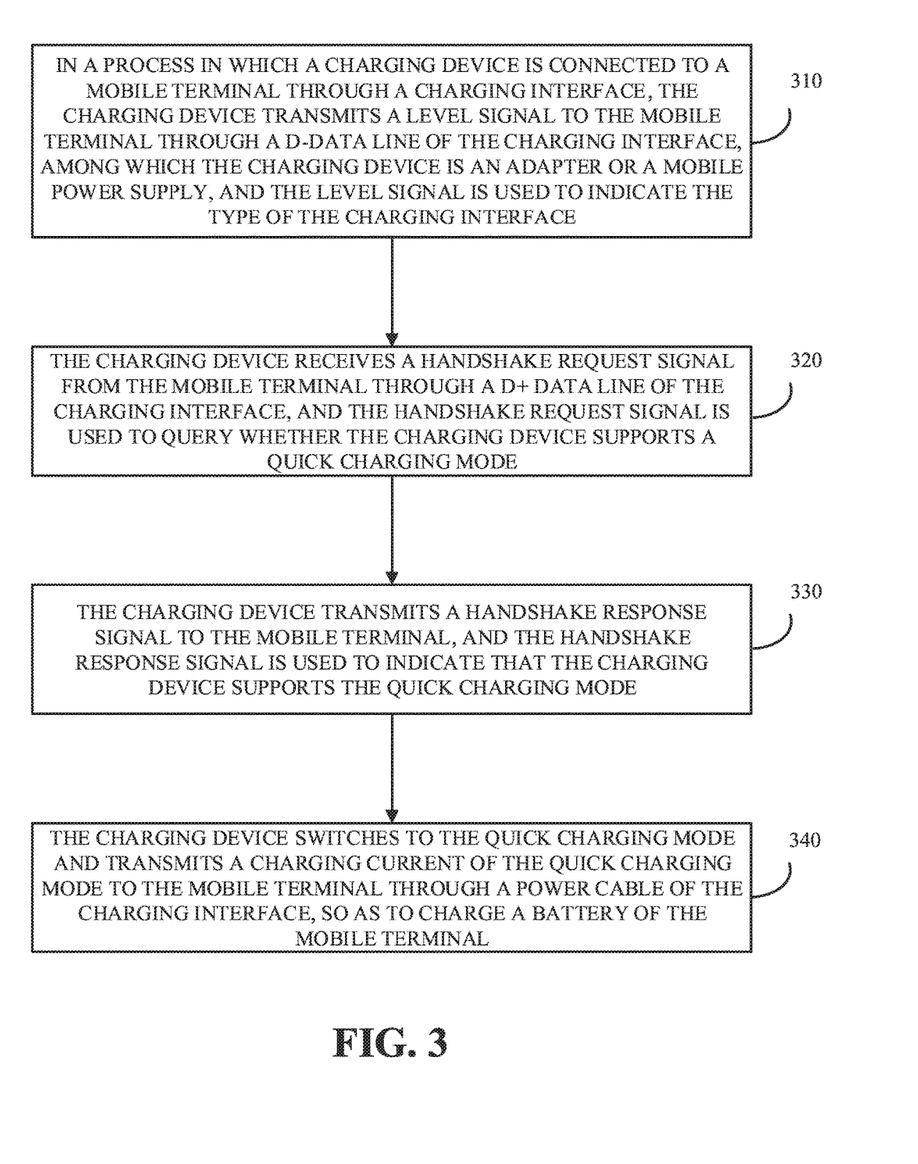
FIG. 3 is a schematic flow chart illustrating a charging control method according to an implementation of the present disclosure.

FIG. 3 is a schematic flow chart illustrating the charging control method according to an implementation of the present disclosure. The method illustrated in FIG. 3 can be performed by a charging device and the method can begin at operation 310.

At operation 310, in a process in which a charging device is connected to a mobile terminal through a charging interface, the charging device transmits a level signal to the mobile terminal through a D-data line of the charging interface, among which the charging device is an adapter or a mobile power supply, and the level signal is used to indicate the type of the charging interface.

At operation 320, the charging device receives a handshake request signal from the mobile terminal through a D+ data line of the charging interface, and the handshake request signal is used to query whether the charging device supports a quick charging mode.

At operation 330, the charging device transmits a handshake response signal to the mobile terminal, and the handshake response signal is used to indicate that the charging device supports the quick charging mode.

As an implementation, at operation 330, the charging device can transmit the handshake response signal of a specific waveform to the mobile terminal through the D+ data line of the charging interface.

At operation 340, the charging device switches to the quick charging mode and transmits a charging current of the quick charging mode to the mobile terminal through a power cable of the charging interface, so as to charge a battery of the mobile terminal.

According to the implementation of the present disclosure, the handshake negotiation process with regard to quick charging is initiated by the mobile terminal rather than the charging device, and the charging speed of the mobile terminal can be guaranteed. In addition, the handshake negotiation is conducted through the D+ data line without conflicting with the D-date line used to transmit the level signal; therefore, the problem that errors may occur in the handshake negotiation process with regard to quick charging in the related art can be addressed.

The charging control method according to implementations of the present disclosure has been described in detail with reference to FIG.1A-FIG.3; hereinafter, a mobile terminal and a charging device according to implementations of the present disclosure will be described in detail with reference to FIG. 4-FIG. 7.

Figure 4:
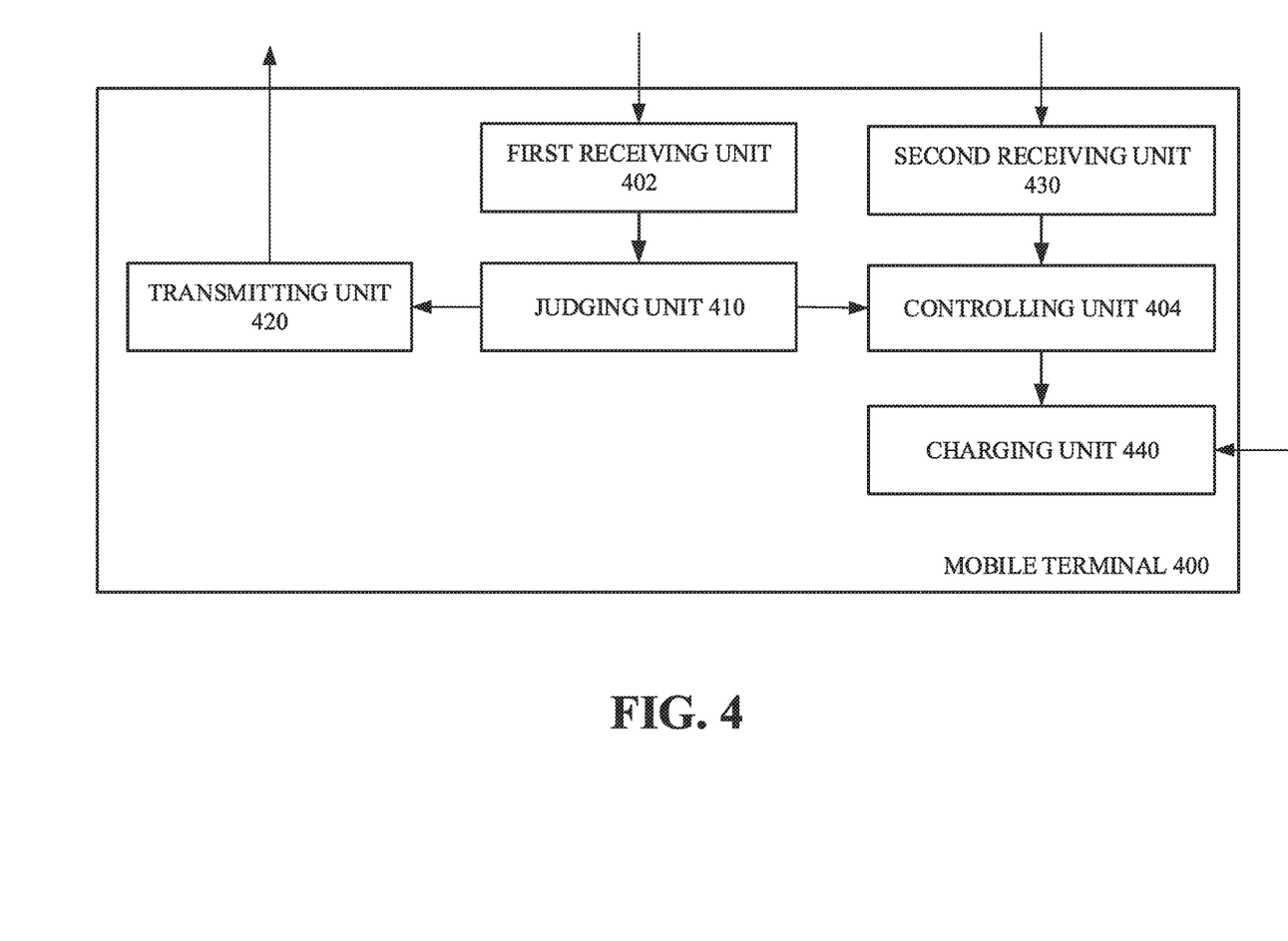
FIG. 4 is a schematic block diagram illustrating a mobile terminal according to an implementation of the present disclosure.

FIG. 4 is a schematic block diagram illustrating the mobile terminal according to an implementation of the present disclosure. FIG. 4 illustrates a mobile terminal 400 that can implement each step of FIG.1B or FIG. 1C; to avoid duplication, the steps will not be described here in detail. As illustrated in FIG. 4, the mobile terminal 400 can include a first receiving unit 402 such as a receiver, a judging unit 410 such as a controller or logic circuit, a transmitting unit 420 such as a transmitter, a second receiving unit 430 such as a receiver, a controlling unit 404 such as a controller or logic circuit.

The first receiving unit 402 is configured to receive a level signal transmitted from a charging device through a D-data line of a charging interface, among which the mobile terminal is connected to the charging device through the charging interface. Optionally, as an implementation, the first receiving unit 402 is configured to receive the level signal through the D-data line.

The judging unit 410 is configured to determine the type of the charging device according to the level signal received by the first receiving unit 402. For example, the judging unit 410 is configured to determine the type of the charging interface of the charging device according to the level signal, and then determine the type of the charging device according to the type of the charging interface of the charging device.

For example, the judging unit 410 is configured to determine whether the charging interface of the charging device is a USB_SDP type charging interface; if the charging interface of the charging device is not the USB_SDP type charging interface, the judging unit 410 determines that the charging device is an adapter or a mobile power supply; if the charging interface of the charging device is the USB_SDP type charging interface, the judging unit 420 determines that the charging device is not an adapter or a mobile power supply.

The transmitting unit 420 is configured to transmit a handshake request signal to the charging device through a D+ data line of the charging interface if it is determined by the judging unit 410 that the charging device is an adapter or a mobile power supply, and the handshake request signal is used to query whether the charging device supports a quick charging mode. As an implementation, the transmitting unit 420 is configured to transmit the handshake request signal of a specific waveform to the charging device periodically through the D+ data line.

The second receiving unit 430 is configured to receive a handshake response signal transmitted from the charging device; the handshake response signal is used to indicate that the charging device supports the quick charging mode.

The controlling unit 404 is configured to cause the mobile terminal to switch to the quick charging mode.

As an implementation, the mobile terminal 400 can further include a charging unit 440 such as a charging circuit. The charging unit 440 is configured to introduce a charging current of the quick charging mode from the charging device through a power cable of the charging interface and charge a battery of the mobile terminal, so as to charge a battery of the mobile terminal.

According to the implementation of the present disclosure, the mobile terminal initiates the handshake negotiation process with regard to quick charging, and the mobile terminal can conduct handshake negotiation with the charging device through the D+ data line without affecting the D-data line used to transmit the level signal; therefore, the problem that errors may occur in the handshake negotiation process with regard to quick charging in the related art can be addressed.

As an implementation, the controlling unit 404 is further configured to cause the mobile terminal to switch to a normal charging mode if it is determined by the judging unit 410 that the charging device is not an adapter or a mobile power supply, and the charging unit 440 is configured to introduce a charging current of the normal charging mode from the charging device through the power cable of the charging interface, so as to charge the battery of the mobile terminal. The quick charging mode has a charging speed that is higher than a charging speed of the normal charging mode.

Figure 5A:
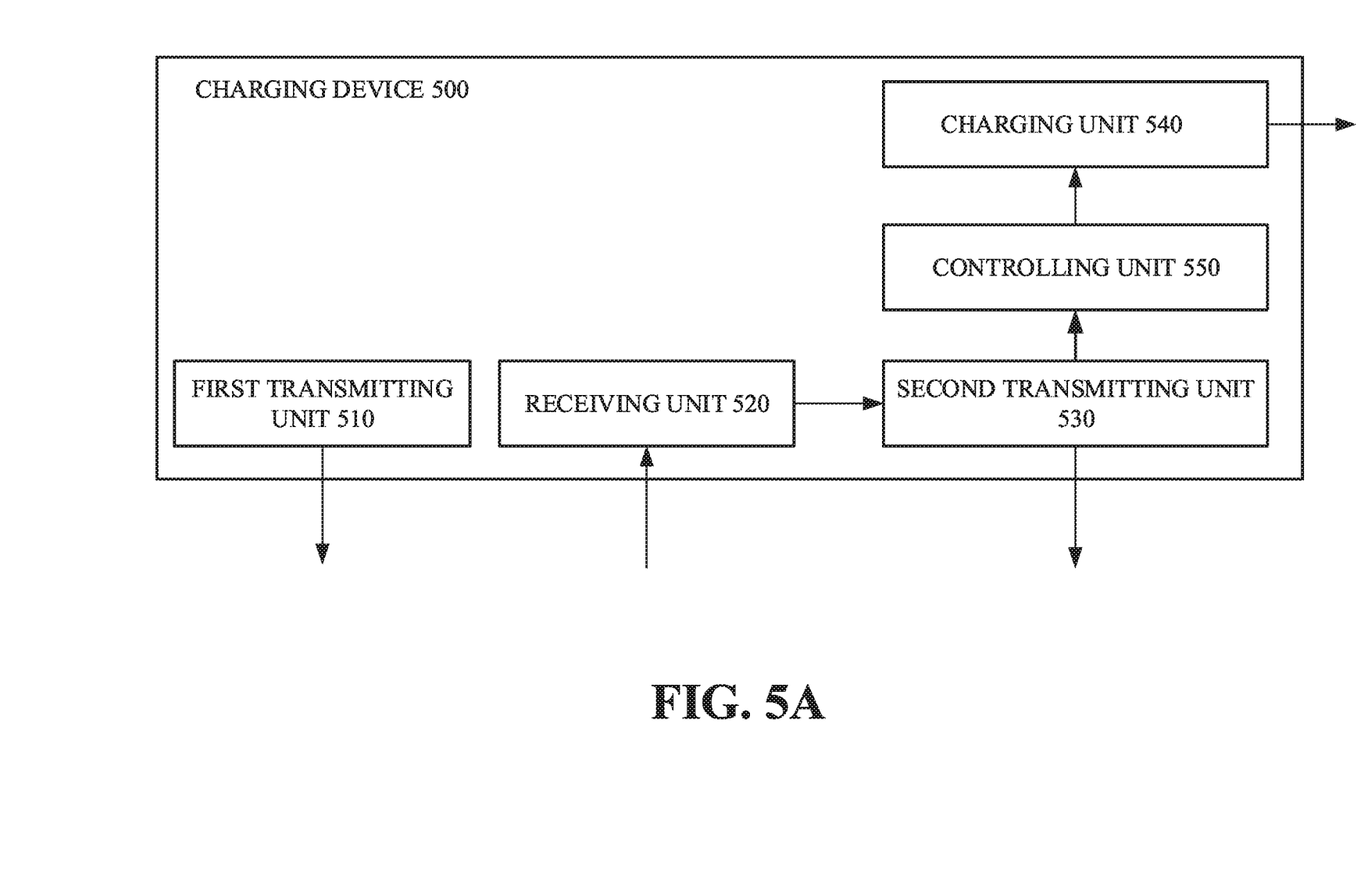
FIG. 5A is a schematic block diagram illustrating a charging device according to an implementation of the present disclosure.

FIG. 5 is a schematic block diagram illustrating the charging device according to an implementation of the present disclosure. FIG. 5 illustrates a charging device 500 that can implement each step of FIG. 3; to avoid duplication, the steps will not be described here in detail. As illustrated in FIG. 5, the charging device 500 can be an adapter or a mobile power supply, and can include a first transmitting unit 510 such as a transmitter, a receiving unit 520 such as a receiver, and a second transmitting unit 530 such as a transmitter, and a controlling unit 550 such as a controller and a logic circuit.

The first transmitting unit 510 is configured to transmit a level signal to a mobile terminal through a D-data line of a charging interface; the charging device is connected to the mobile terminal through the charging interface, and the level signal is used to indicate the type of the charging interface.

The receiving unit 520 is configured to receive a handshake request signal from the mobile terminal through a D+ data line of the charging interface, and the handshake request signal is used to query whether the charging device supports a quick charging mode.

The second transmitting unit 530 is configured to transmit a handshake response signal to the mobile terminal, and the handshake response signal is used to indicate that the charging device supports the quick charging mode. As an implementation, the second transmitting unit 530 is configured to transmit the handshake response signal of a specific waveform to the mobile terminal through the D+ data line of the charging interface.

The controlling unit 550 is configured to cause the charging device to switch to the quick charging mode.

As an implementation, the charging device can further include a charging unit 540 such as a charging circuit. The charging unit 540 is configured to transmit a charging current of the quick charging mode to the mobile terminal through a power cable of the charging interface, so as to charge a battery of the mobile terminal.

According to the implementation of the present disclosure, the handshake negotiation process with regard to quick charging is initiated by the mobile terminal rather than the charging device, and the handshake negotiation between the mobile terminal and the charging device can be conducted through the D+ data line without conflicting with the D-data line used to transmit the level signal; therefore, the problem that errors may occur in the handshake negotiation process with regard to quick charging in the related art can be addressed.

Figure 5B:
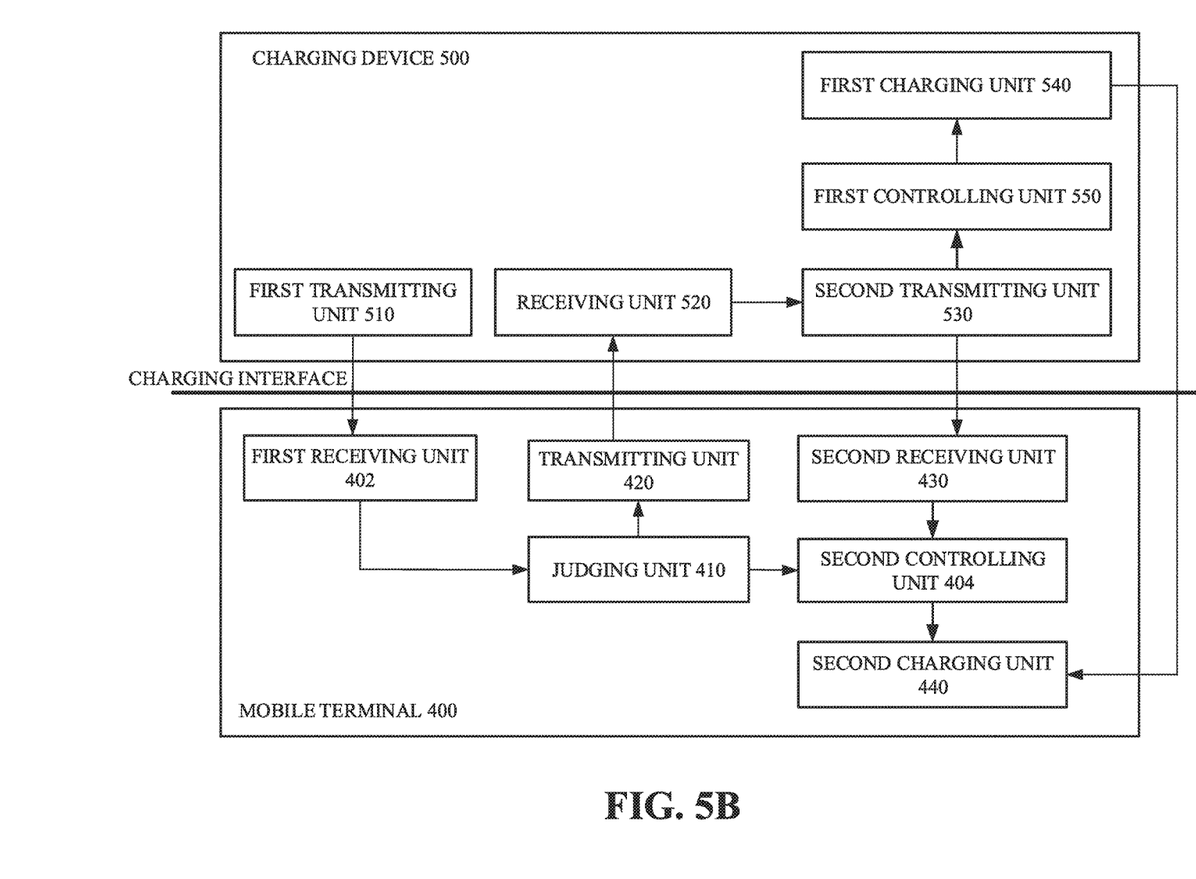
FIG. 5B is a schematic block diagram illustrating a system including the mobile terminal and the charging device illustrated in FIG. 4 and FIG. 5A respectively.

Based on the mobile terminal illustrated in FIG. 4 and the charging device illustrated in FIG. 5A, FIG. 5B illustrates a system in which the mobile terminal and the charging device are connected through a charging interface and communicate with each other for handshake negotiation. As illustrated in FIG. 5B, the first controlling unit 550 can control the charging device 500 to switch to the quick charging mode, and the first charging unit 540 can transmit a charging current of the quick charging mode to the mobile terminal. Correspondingly, the second controlling unit 404 can control the mobile terminal to switch to the quick charging mode, and the second charging unit can receive the charging current of the quick charging mode from the first charging unit 540 of the charging device. For other related details, please refer to the mobile terminal and the charging device described above, and it will not be repeated here.

Figure 6:
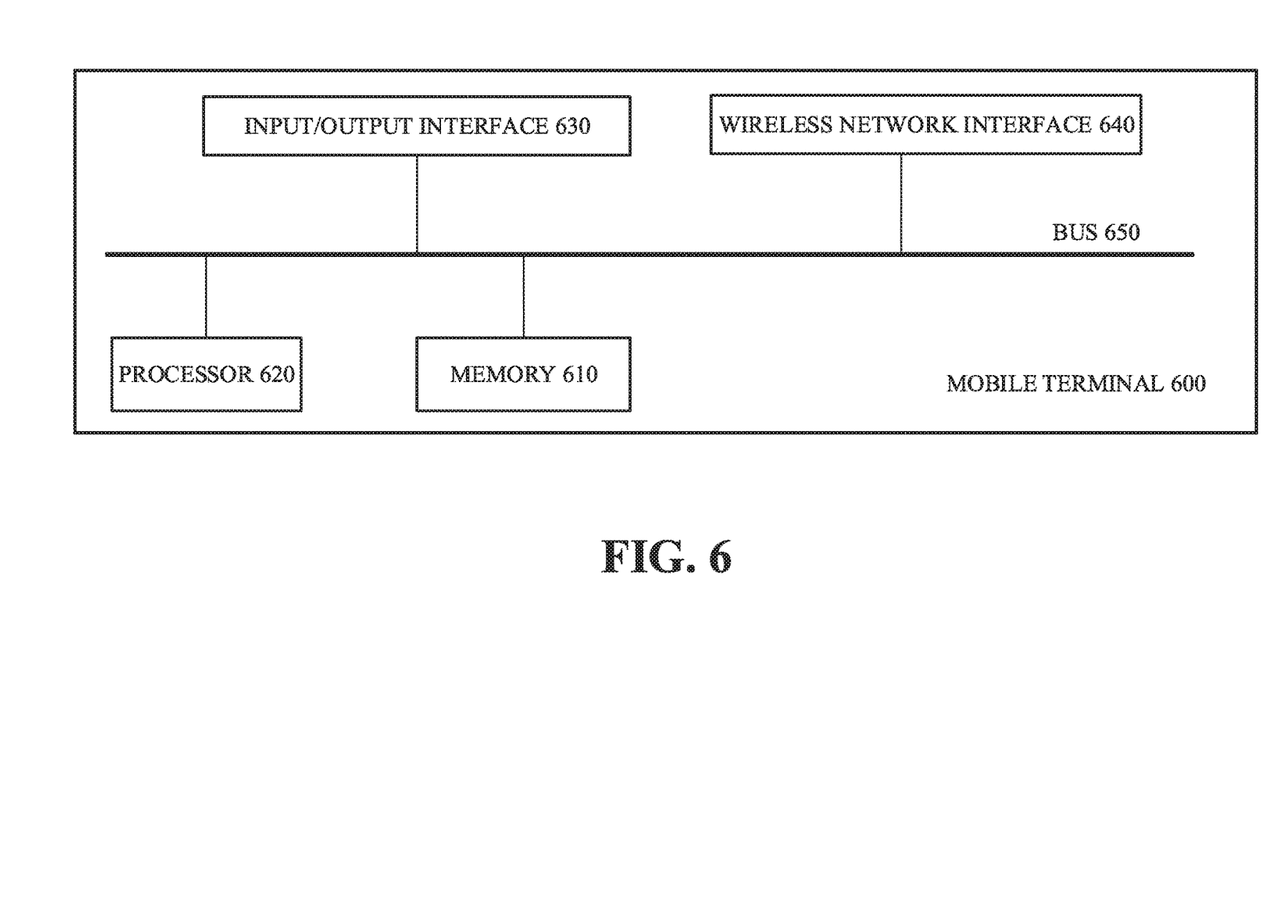
FIG. 6 is a schematic block diagram illustrating a mobile terminal according to an implementation of the present disclosure.

FIG. 6 is a schematic block diagram illustrating a mobile terminal according to an implementation of the present disclosure. FIG. 6 illustrates a mobile terminal 600 that can implement each step of FIG. 1A-1C; to avoid duplication, the steps will not be described here in detail. As illustrated in FIG. 6, the mobile terminal 600 can include a memory 610 configured to store programs, at least one processor 620 (for ease of explanation, only one is illustrated in FIG. 6) such as a CPU configured to execute the programs stored in the memory 610, an input/output interface 630 such as a charging interface, and a wireless network interface 640, which can be connected and communicate with each other via a BUS 650.

When executed, the programs are adapted to cause the processor 620 to perform the following operations. In a process in which a mobile terminal is connected to a charging device through a charging interface, the processor 620 is configured to receive a level signal transmitted from the charging device through a D-data line of the charging interface, so as to determine the type of the charging device. The processor 620 is configured to transmit a handshake request signal to the charging device through a D+ data line of the charging interface if it is determined that the charging device is an adapter or a mobile power supply, and the handshake request signal is used to query whether the charging device supports a quick charging mode. The processor 620 is configured to receive a handshake response signal transmitted from the charging device; the handshake response signal is used to indicate that the charging device supports the quick charging mode. The processor 620 is configured to cause the mobile terminal to switch to the quick charging mode, and introduce a charging current of the quick charging mode from the charging device through a power cable of the charging interface, so as to charge a battery of the mobile terminal.

According to the implementation of the present disclosure, the mobile terminal initiates the handshake negotiation process with regard to quick charging, and the mobile terminal can conduct handshake negotiation with the charging device through the D+ data line; therefore, the problem that errors may occur in the handshake negotiation process with regard to quick charging in the related art can be addressed.

Optionally, as an implementation, the processor 620 is further configured to cause the mobile terminal to switch to a normal charging mode and introduce a charging current of the normal charging mode from the charging device through the power cable of the charging interface, so as to charge the battery of the mobile terminal, if it is determined that the charging device is not an adapter or a mobile power supply. The quick charging mode has a charging speed faster than the charging speed of the normal charging mode.

Optionally, as one implementation, the processor 620 is configured to transmit the handshake request signal of a specific waveform to the charging device periodically through the D+ data line.

Optionally, as an implementation, the processor 620 is configured to receive the level signal through the D-data line, determine the type of the charging interface of the charging device according to the level signal, and determine the type of the charging device according to the type of the charging interface of the charging device.

Optionally, as an implementation, the processor 620 is configured to determine whether the charging interface of the charging device is a universal serial bus standard downlink port (USB_SDP) type charging interface; if the charging interface of the charging device is not the USB_SDP type charging interface, the processor 620 is configured to determine that the charging device is an adapter or a mobile power supply; if the charging interface of the charging device is the USB_SDP type charging interface, the processor 620 is configured to determine that the charging device is not an adapter or a mobile power supply.

Figure 7:
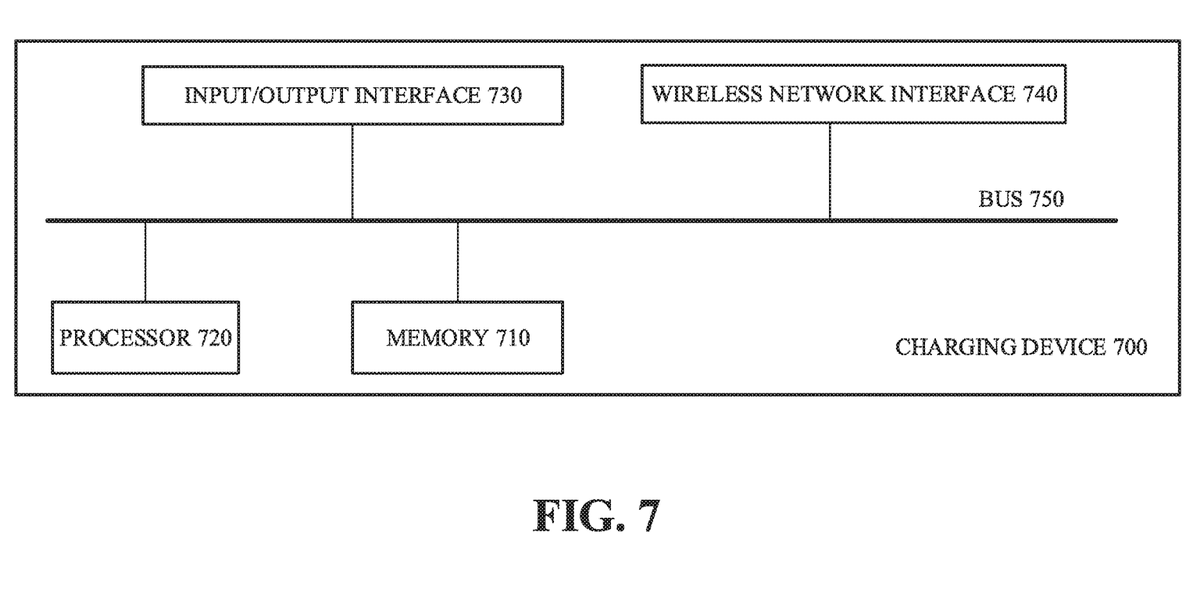
FIG. 7 is a schematic block diagram illustrating a charging device according to an implementation of the present disclosure.

FIG. 7 is a schematic block diagram illustrating a charging device according to an implementation of the present disclosure. FIG. 7 illustrates a charging device 700 that can implement each step of FIG. 3; to avoid duplication, the steps will not be described here in detail. As illustrated in FIG. 7, the charging device 700 can include a memory 710 configured to store programs, at least one processor 720 (for ease of explanation, only one is illustrated in FIG. 7) such as a CPU configured to execute the programs stored in the memory 710, an input/output interface 730 such as a charging interface, and a wireless network interface 740, which can be connected and communicate with each other via a BUS 750.

When executed, the programs are adapted to cause the processor 720 to perform the following operations. In a process in which a charging device is connected to a mobile terminal through a charging interface, the processor 720 is configured to transmit a level signal to the mobile terminal through a D-data line of the charging interface, among which the charging device is an adapter or a mobile power supply, and the level signal is used to indicate the type of the charging interface. The processor 720 is configured to receive a handshake request signal from the mobile terminal through a D+ data line of the charging interface, and the handshake request signal is used to query whether the charging device supports a quick charging mode. The processor 720 is configured to transmit a handshake response signal to the mobile terminal, and the handshake response signal is used to indicate that the charging device supports the quick charging mode. The processor 720 is configured to cause the charging device to switch to the quick charging mode, and transmit a charging current of the quick charging mode to the mobile terminal through a power cable of the charging interface, so as to charge a battery of the mobile terminal.

According to the implementation of the present disclosure, the handshake negotiation process with regard to quick charging is initiated by the mobile terminal rather than the charging device, and the handshake negotiation between the mobile terminal and the charging device is conducted through the D+ data line without mixing with the D− data line; therefore, the problem that errors may occur in the handshake negotiation process with regard to quick charging in the related art can be addressed.

Optionally, as an implementation, the processor 720 is configured to transmit the handshake response signal of a specific waveform to the mobile terminal through the D+ data line of the charging interface.

Those of ordinary skill in the art will recognize that, the elements and algorithm steps of various examples described in connection with the implementations disclosed herein can be implemented in electronic hardware, or a combination of computer software and electronic hardware. Whether these functions are implemented in hardware or software depends on the specific application and design constraints of a technical solution. For each particular application, the skilled person can use different methods for the implementation of the described functions; however, such implementation should not be considered as a departure from the scope of the present disclosure.

As will be apparent to those skilled in the art, for the convenience and conciseness of description, with regard to the working processes of the system, the device, and the units illustrated above, reference can be made to corresponding processes in the foregoing method implementations and will not be repeated here.

In the implementations of the present disclosure, it will be appreciated that, the system, the device, and the method disclosed can be achieved in other ways. For example, the device implementations described above are merely illustrative; the division of the units is only a logical function division, and the units can be divided into other ways during the actual implementation, for example, multiple units or components can be combined or can be integrated into another system, or some features can be ignored or not implemented. In addition, the coupling or direct coupling or communication connection illustrated or discussed between each other can be an indirect coupling or indirect communication connection via some interface, device, or unit, and it can be in electrical, mechanical or other forms.

The units illustrated as separate components can or cannot be physically separated, and the components displayed as units can or cannot be physical units, that is to say, the units or components can be located in one place, or can be distributed over multiple network elements. Some or all of these units can be selected according to actual needs to achieve the purpose of the implementations of the present disclosure.

In addition, the functional units in various implementations of the present disclosure can be integrated in one processing unit. It is also possible that the individual units are physically present individually, or, it is also possible to integrate two or more units into one unit.

When implemented in the form of a software functional unit and sold or used as a stand-alone product, the functionality can be stored in a computer readable storage medium. Based on such understanding, technical solutions of the present disclosure in essence, or in part, or part of the technical solutions which contributes to the related art, can be embodied in the form of a software product. The software product can be stored in a storage medium and include several instructions, which is configured to cause computer equipment (such as a personal computer, a server, or network equipment) to execute all or part of the method steps of the implementations of the present disclosure. The aforementioned storage medium includes U-disk, mobile hard disk, Read-Only Memory (ROM), Random Access Memory (RAM), disk, CD, or various media that can store program code.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for charging control, comprising:
    receiving, by a mobile terminal, a level signal transmitted from a charging device to determine a type of the charging device, the level signal being configured for indicating the type of the charging device;
    transmitting, from the mobile terminal to the charging device, a handshake request signal according to a timing in which data transmission is delayed for a certain length of time after a rising interrupt is received, when it is determined that the charging device is an adapter or a mobile power supply, wherein the handshake request signal is used to query whether the charging device supports a quick charging mode;
    receiving, by the mobile terminal, a handshake response signal transmitted from the charging device and switching to the quick charging mode, wherein the handshake response signal is used to indicate that the charging device supports the quick charging mode; and
    switching to a normal charging mode and introducing a charging current of the normal charging mode from the charging device through a power cable of the charging interface to charge a battery of the mobile terminal, when it is determined that the charging device is not the adapter or the mobile power supply, wherein the quick charging mode has a charging speed that is higher than a charging speed of the normal charging mode.

2. The method of claim 1, wherein the handshake request signal is transmitted from the mobile terminal to the charging device through a D+ data line.

3. The method of claim 2, wherein transmitting, by the mobile terminal, a handshake request signal to the charging device comprises: transmitting, by the mobile terminal, the handshake request signal of a specific waveform to the charging device periodically through the D+ data line.

4. The method of claim 1, wherein the level signal is received by the mobile terminal from the charging device through a D− data line.

5. The method of claim 1, wherein receiving, by the mobile terminal, the level signal transmitted from the charging device to determine the type of the charging device comprises:
    receiving, by the mobile terminal, the level signal through a D− data line;
        determining, by the mobile terminal, the type of the charging interface of the charging device according to the level signal; and
        determining, the mobile terminal, the type of the charging device according to the type of the charging interface of the charging device.

6. The method of claim 5, wherein determining, by the mobile terminal, the type of the charging device according to the type of the charging interface of the charging device comprises: determining whether the charging interface of the charging device is a universal serial bus standard downlink port (USB_SDP) type charging interface;
    determining that the charging device is the adapter or the mobile power supply when the charging interface of the charging device is not the USB_SDP type charging interface; and determining that the charging device is not the adapter or the mobile power supply when the charging interface of the charging device is the USB_SDP type charging interface.

7. The method of claim 1, wherein the charging device and the mobile terminal are connected though the charging interface.

8. The method of claim 1, further comprising:
    introducing a charging current of the quick charging mode from the charging device through the power cable of the charging interface to charge the battery of the mobile terminal.

9. A method for charging control, comprising:
    transmitting a level signal to a mobile terminal through a D-data line of a charging interface by a charging device, wherein a level signal is used to indicate a type of the charging interface;
    receiving a handshake request signal from the mobile terminal through a D+ data line of the charging interface by the charging device, according to a reception timing in which data collection is delayed for a certain length of time after a rising edge interrupt is received, wherein the handshake request signal is used to query whether the charging device supports a quick charging mode;

transmitting a handshake response signal to the mobile terminal by the charging device, wherein the handshake response signal is used to indicate that the charging device supports the quick charging mode; and switching to the quick charging mode and transmitting a charging current of the quick charging mode to the mobile terminal through a power cable of the charging interface by the charging device to charge a battery of the mobile terminal.

10. The method of claim 9, wherein transmitting a handshake response signal to the mobile terminal by the charging device comprises:

transmitting the handshake response signal of a specific waveform to the mobile terminal through the D+ data line of the charging interface by the charging interface.

11. A mobile terminal, comprising:

a first receiving unit, configured to receive a level signal transmitted from a charging device, the level signal being configured for indicating a type of the charging device;

a judging unit, configured to determine the type of the charging device in accordance with the level signal;

a transmitting unit, configured to transmit a handshake request signal to the charging device according to a timing in which data transmission is delayed for a certain length of time after a rising interrupt is received, when the judging unit determines that the charging device is an adapter or a mobile power supply, wherein the handshake request signal is used to query whether the charging device supports a quick charging mode;

a second receiving unit, configured to receive a handshake response signal transmitted from the charging device, wherein the handshake response signal is used to indicate that the charging device supports the quick charging mode; and a controlling unit, configured to cause the mobile terminal to switch to the quick charging mode and to cause the mobile terminal to enter a normal charging mode when the judging unit determines that the charging device is not the adapter or the mobile power supply.

12. The mobile terminal of claim 11, wherein the mobile terminal further comprises:

a charging unit configured to:
introduce a charging current of the normal charging mode from the charging device through a power cable of a charging interface to charge a battery of the mobile terminal, wherein the quick charging mode has a first charging speed that is higher than a second charging speed of the normal charging mode.

13. The mobile terminal of claim 11, wherein the transmitting unit is configured to transmit the handshake request signal to the charging device through a D+ data line.

14. The mobile terminal of claim 13, wherein the transmitting unit is configured to transmit the handshake request signal of a specific waveform to the charging device periodically through the D+ data line.

15. The mobile terminal of claim 11, wherein the first receiving unit is configured to receive the level signal through a D– data line.

16. The mobile terminal of claim 11, wherein the judging unit is configured to determine the type of a charging interface of the charging device according to the level signal, and determine the type of the charging device according to the type of the charging interface of the charging device.

17. The mobile terminal of claim 16, wherein the judging unit is configured to:

determine whether the charging interface of the charging device is a USB_SDP type charging interface;

determine that the charging device is the adapter or the mobile power supply when the charging interface of the charging device is not the USB_SDP type charging interface; and determine that the charging device is not the adapter or the mobile power supply when the charging interface of the charging device is the USB_SDP type charging interface.

18. The mobile terminal of claim 11, further comprising a charging unit, wherein the charging unit is configured to introduce a charging current of the quick charging mode from the charging device through a power cable of a charging interface to charge a battery of the mobile terminal.

19. The method of claim 9, wherein the certain length of time is 2n ms, n being a positive integer.

* * * * *